(12) United States Patent
Lee

(10) Patent No.: US 9,813,755 B2
(45) Date of Patent: Nov. 7, 2017

(54) DISPLAY APPARATUS AND CONTROLLING METHODS THEREOF

(71) Applicant: SAMSUNG ELECTRONICS CO., LTD., Suwon-si (KR)

(72) Inventor: Joo-heon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 14/661,760

(22) Filed: Mar. 18, 2015

(65) Prior Publication Data

US 2015/0301783 A1 Oct. 22, 2015

(30) Foreign Application Priority Data

Apr. 18, 2014 (KR) .................. 10-2014-0046464

(51) Int. Cl.
| | |
|---|---|
| H04N 21/431 | (2011.01) |
| G09G 5/14 | (2006.01) |
| H04N 5/45 | (2011.01) |
| H04N 21/462 | (2011.01) |
| H04N 21/47 | (2011.01) |

(52) U.S. Cl.
CPC ........... *H04N 21/4312* (2013.01); *H04N 5/45* (2013.01); *H04N 21/4314* (2013.01); *H04N 21/4622* (2013.01); *H04N 21/47* (2013.01); *G09G 5/14* (2013.01)

(58) Field of Classification Search
CPC .. H04N 7/17318; H04N 21/4312; H04N 5/45; G06F 3/0482
USPC ........................................................ 345/671
See application file for complete search history.

(56) References Cited

U.S. PATENT DOCUMENTS

| | | | | |
|---|---|---|---|---|
| 2002/0047866 | A1* | 4/2002 | Matsumoto | G06F 3/0482 715/810 |
| 2003/0227489 | A1* | 12/2003 | Arend | G06F 3/04895 715/804 |
| 2005/0162337 | A1* | 7/2005 | Ohashi | G06F 3/14 345/1.1 |
| 2005/0174364 | A1 | 8/2005 | Malmstrom | |
| 2006/0107294 | A1 | 5/2006 | Rivlin et al. | |
| 2008/0066126 | A1* | 3/2008 | Walter | H04N 7/17318 725/97 |
| 2008/0259093 | A1* | 10/2008 | Tseng | G06F 3/1431 345/619 |

(Continued)

FOREIGN PATENT DOCUMENTS

| | | |
|---|---|---|
| KR | 10-2012-0035772 A | 4/2012 |
| WO | 97/04431 A1 | 2/1997 |

OTHER PUBLICATIONS

Communication dated Sep. 24, 2015, issued by the European Patent Office in European Application No. 15161775.0.

*Primary Examiner* — Antonio Xavier
(74) *Attorney, Agent, or Firm* — Sughrue Mion, PLLC

(57) ABSTRACT

A method of controlling a display apparatus is provided. The display apparatus displays a screen comprising a plurality of content areas which indicate different content, in response to a predefined control signal being received, displays a UI screen for selecting a content area to be controlled based on an attribute of the received predefined control signal, among the plurality of content areas, and in response to at least one content area being selected, controls a display operation of the selected at least one content area according to the control signal.

14 Claims, 17 Drawing Sheets

(56) References Cited

U.S. PATENT DOCUMENTS

| | | | |
|---|---|---|---|
| 2009/0031349 A1* | 1/2009 | Han | H04N 5/44543 725/39 |
| 2009/0109338 A1* | 4/2009 | Furutani | H04N 5/44591 348/565 |
| 2010/0118195 A1* | 5/2010 | Eom | G08C 17/00 348/564 |
| 2010/0186046 A1* | 7/2010 | Bae | H04N 5/44543 725/56 |
| 2012/0274852 A1* | 11/2012 | Jung | G06F 9/4443 348/564 |
| 2013/0050274 A1* | 2/2013 | Yamada | G09G 5/14 345/671 |
| 2013/0132984 A1* | 5/2013 | Walter | H04N 7/17318 725/13 |
| 2013/0328784 A1* | 12/2013 | Lee | G09G 5/006 345/169 |
| 2014/0096158 A1 | 4/2014 | Chao | |
| 2015/0181151 A1* | 6/2015 | Nguyen | H04N 5/4403 348/565 |
| 2015/0301777 A1* | 10/2015 | Jang | G06F 3/14 345/169 |

\* cited by examiner

DISPLAY APPARATUS AND CONTROLLING METHODS THEREOF

CROSS-REFERENCE TO RELATED APPLICATION(S)

This application claims priority from Korean Patent Application No. 10-2014-0046464, filed on Apr. 18, 2014, in the Korean Intellectual Property Office, the disclosure of which is incorporated herein by reference in its entirety.

BACKGROUND

1. Field

Methods and apparatuses consistent with the exemplary embodiments relate to providing a display apparatus and a method of controlling thereof, and more particularly, to providing a display apparatus which has a function for controlling a display operation of a plurality of content areas of a screen, and a method of controlling thereof.

2. Description of the Related Art

Due to the development of electronic technology, diverse types of electronic products have been developed and propagated. In particular, display apparatuses such as televisions (TVs), personal computers (PCs), and notebook PCs have been generally used in many households.

As the use of display apparatuses has increased, a user's need for diverse functions has increased. Accordingly, manufacturers have tried to meet the user's needs. Consequently, products having unprecedented new functions have been introduced.

As an example, according to the user's need, a display apparatus, which, in addition to displaying an image, is able to execute separate content such as a game or Internet content while the image is simultaneously displayed. In other words, the display apparatus is able to display a plurality of content areas to execute various contents simultaneously. However, when various contents are executed through the plurality of content areas of the screen, content areas which a user has to control increase in number, and thus, it is difficult for the user to control the content areas of the screen. Accordingly, a method of easily controlling a display operation by controlling a plurality of content areas of the screen is needed.

SUMMARY

Exemplary embodiments provide a display apparatus for selecting a split area of a display screen to be controlled by a user through a user interface (UI) screen when different contents are displayed through a plurality of split screens, and method of controlling thereof.

According to an aspect of the exemplary embodiments, there is provided a method of controlling a display apparatus, the method comprising displaying a screen consisting of a plurality of split areas which display different contents; displaying a user interface (UI) screen for selecting at least one split area of the screen among the plurality of split areas of the screen to be controlled in response to a control signal being inputted, and controlling a display operation of the selected at least one split area, according to the control signal in response to at least one split area being selected from the UI screen.

The method of controlling may further comprise, in response to a control right being set for a first split area among the plurality of split areas, simultaneously controlling a display operation of the first split area where the control right is set and the at least one selected split area which is selected from the UI screen, according to the control signal.

The method of controlling may further comprise, in response to a control signal for performing an operation for controlling only one split area among the plurality of split areas being inputted, controlling a display operation of the one split areas according to the control signal.

The method of controlling may further comprise, in response to the control signal being inputted while an option to select an object to be controlled through the UI screen is turned off, controlling a display operation of the split area where the control right is set among the plurality of split areas, according to the control signal.

The method of controlling may further comprise, in response to the control signal being an audio control signal for adjusting an audio, adjusting an output status of an audio signal of a content displayed on the at least one selected split areas according to the audio control signal.

The UI screen may include only a graphic image corresponding to at least one split area where the control signal is applicable among the plurality of split areas.

Otherwise, the UI screen may include a plurality of graphic images corresponding to the plurality of split areas, respectively.

According to an aspect of the exemplary embodiments, there is provided a display apparatus comprising a displayer configured to display a screen consisting of a plurality of split areas which display different contents; a user interface (UI) generator configured to, in response to a control signal being inputted, generate a UI screen for selecting a split area among the plurality of split area to be controlled according to the control signal, and a controller configured to control the displayer to display the generated UI screen, and in response to at least one split area being selected from the UI screen, to control a display operation of the selected at least one split area, according to the control signal.

In response to a control right being set for a first split area among the plurality of split areas, the controller may control a display operation of the first split area where the control right is set and the at least one selected split area according to the control signal.

In response to a control signal for performing an operation for controlling only one split area among the plurality of split areas being inputted, the controller controls a display operation of the at least one split area according to the control signal, without displaying the UI screen.

In response to the control signal being inputted while an option to select an object to be controlled through the UI screen is turned off, the controller controls a display operation of a split area where a control right is set among the plurality of split areas, according to the control signal.

In response to the control signal being an audio control signal for adjusting an audio, the method comprises adjusting an output status of an audio signal of a content displayed on the at least one of the split areas which is selected from the UI screen, according to the audio control signal.

The UI screen may comprise only a graphic image corresponding to at least one split area where the control signal is applicable among the plurality of split areas.

According to another exemplary embodiment, the UI screen may comprise a plurality of graphic images corresponding to the plurality of split areas, respectively.

DETAILED DESCRIPTION OF THE EXEMPLARY EMBODIMENTS

Exemplary embodiments are described in greater detail with reference to the accompanying drawings. In describing the exemplary embodiments, if a detailed explanation of the related art or configuration obscures the substance of the exemplary embodiments with unnecessary detail, the detailed explanation is omitted.

Figure 1:
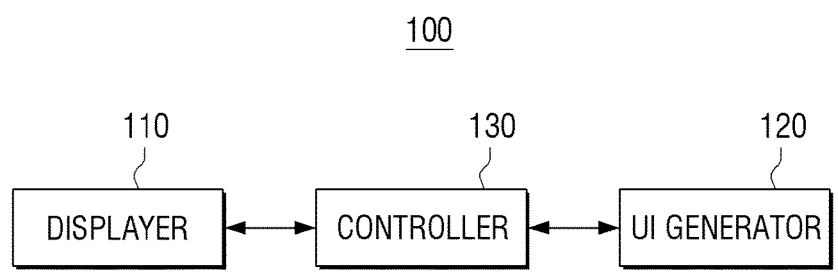
FIG. 1 is a block diagram illustrating a configuration of a display apparatus according to an exemplary embodiment.

FIG. 1 is a block diagram illustrating a configuration of a display apparatus according to the exemplary embodiment. Referring to FIG. 1, the display apparatus 100 includes a displayer 110, a UI generator 120 and a controller 130.

The display apparatus 100 displays a screen consisting of a plurality of content areas which display different contents.

The UI generator 120 generates a UI screen related to a display operation of the plurality of content areas.

The controller 130 controls an operation of the display apparatus 100.

The controller 130, in response to a predetermined control signal being received when different contents are played through the plurality of content areas of the screen, controls the UI generator 120 to generate a UI screen to allow the user to select at least one content area to be controlled according to the control signal.

Herein, a control signal refers to a signal for controlling a display operation or a display status of the plurality of content areas, and various types of control signals having different attributes may exist. For example, the control signal may include signals for controlling operations such as channel up, channel down, fast forward, rewind, display effect, stop, etc., but is not limited thereto. That is, another control signal related to a display operation or a display status of a content area may be included.

The UI screen which is generated by the UI generator 120 includes information regarding at least one content area where an received control signal is to be applied, in other words, where a display operation or a display status according to the received control signal is able to be controlled. For example, if a first content area to a fourth content area are included in a screen of the display apparatus 100, and the received control signal is applied to a display operation or a display status of the first content area and the second content area, the UI screen may include information regarding the first content area and the second content area.

At least one content area is selected from the UI screen, and the controller 130 may control the displayer 110 to control the display operation or the display status of the selected at least one content area. In this case, if at least one content area is selected from the UI screen, the controller 130 may control the displayer 110 to remove the UI screen from the screen.

According to the above explanations, in response to different contents being displayed through the plurality of content areas, the display apparatus 200 is able to select a content area to be controlled by a user through the UI screen, and thus, the display operation or the display status of the content area may be easily controlled.

Figure 2:
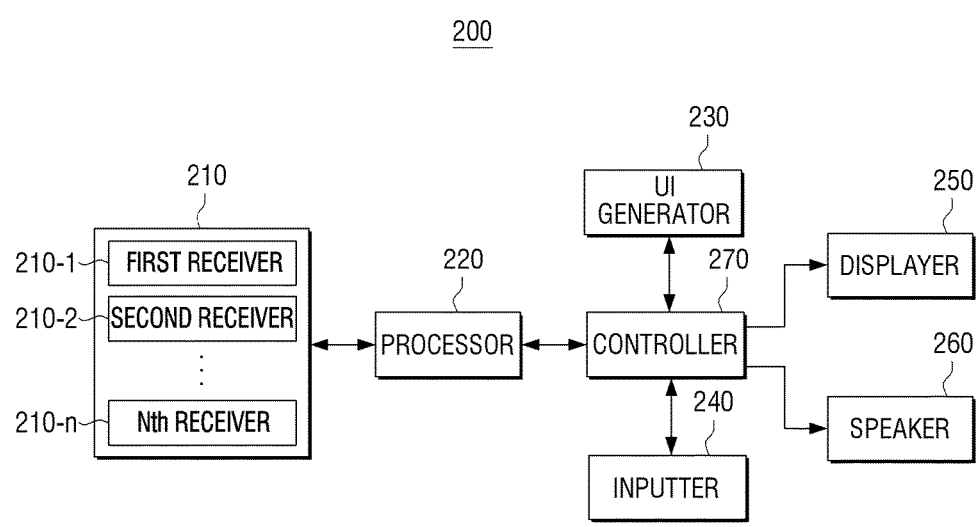
FIG. 2 is a block diagram illustrating a configuration of a display apparatus according to another exemplary embodiment.

FIG. 2 is a block diagram illustrating a configuration of a display apparatus according to another exemplary embodiment. Referring to FIG. 2, the display includes a contents receiver 210, a processor 220, a UI generator 230, an inputter 240, a displayer 250, a speaker 260 and a controller 270.

The content receiver 210 includes a plurality of receivers 210-1, 210-2, . . . , 210-$n$. The plurality of receivers 210-1, 210-2, . . . , 210-$n$ may receive different contents corresponding to the plurality of content areas. For example, a first receiver (210-1) may receive a first broadcasting content corresponding to a first channel, and a second receiver (210-2) may receive a second broadcasting content corresponding to a second channel. Other receivers may receive various contents such as image contents, internet contents, game contents and so on from a DVD, a HMDI, a USB, an internet and so on.

The processor 230 processes the received contents through the content receiver. The processor 230 may perform a scaling process to the content or perform a content conversion according to a compressed format. FIG. 2 merely illustrates one processor 220, however, a plurality of processors 220 may be equipped corresponding to the plurality of receivers 210-1, 210-2, . . . , 210-$n$, respectively.

The UI generator generates a UI screen related to an operation of the display apparatus 200.

The inputter 240 receives various signals according to the user's input. The various signals may be a control signal of the display apparatus, or a select signal regarding various options. The inputter 240 may be a remote controller receiver. The inputter 240 may also be a touch panel combined with the displayer 250. However, the inputter is not limited thereto.

The displayer 250 displays content. The displayer 250 may display content on the entire screen. Otherwise, in response to a multi view function or a split display function of the display apparatus 200 being vitalized, the displayer 250 may display different contents through the screen consisting of the plurality of content areas. The plurality of content areas may be more than 2 areas.

The controller 270 controls an operation of the display apparatus 200.

The speaker 260 outputs an audio signal of the content.

The controller 270, in response to the multi view function or the split display function being enabled according to the user input, divides the screen of the displayer 250 into the plurality of content areas.

The contents to be displayed on the plurality of content areas, respectively, may be selected by the user, but is not limited thereto. In response to the user not selecting or setting the contents to be displayed on the plurality of content areas, respectively, the controller 270 may control the displayer 250 to display the contents received from a predetermined input sources (that is, content receivers) on the plurality of content areas, respectively.

The controller 270, in response to a control signal being received through the inputter 240, controls the displayer 250 to display a UI screen for selecting a content area to be controlled according to the control signal, among the plurality of content areas. Before performing this operation, the controller 270 determines the number of content areas where the received control signal is to be applied.

When the number of content areas where the received control signal is to be applied is one, the controller 270, without displaying the UI screen, may apply the control signal to the content area directly. Accordingly, the display operation or the display status displayed on the content area may be controlled.

For example, in response to a "fast forward" control signal being received, the controller 270 determines a content area where the "fast forward" control signal may be applied. In addition, the controller 270 may transmit the "fast forward" control signal to an external apparatus which provides the determined content area with contents. For example, if "fast forward" control signal can be applied to only a content area where a content received from a DVD source is displayed, the "fast forward" control signal is transmitted to the DVD source, and as the result, contents are fast-forwarded and displayed in a content area corresponding to the DVD source.

the controller 270 may control the displayer 250 to "fast-forward" the content received from the DVD source. In this case, the controller 250, by controlling an operation of the displayer 250 and controlling an operation of the content receiver receiving the content displayed on the corresponding content area, may perform the "fast forward" operation of the content and display the operation through the selected content area.

When the number of content areas where the received control signal is to be applied is more than two, the controller 270 controls the displayer 250 to display the UI screen. Also, in response to at least one content area being selected from the UI screen, the display operation or the display status of the selected at least one content area may be controlled through the control signal.

In response to a second content area being selected from the UI screen while a control right has been set for a first content area among the plurality of content areas, the controller 270 may simultaneously control the display operation or the display status of the first content area where the control right is set, and the selected second content area. It is desirable to perform this operation in response to the content area where the control right is set being included in the UI screen.

According to another exemplary embodiment, in response to the control signal being received, the controller 270 may analyze an attribute of the control signal, determine the content area to be controlled by the control signal among the plurality of content areas according to the analysis, and control the displayer 250 to display the UI which is able to select the determined content area.

For example, when the control signal is regarding channel up/down, the first content area and the second content area display a broadcasting signal, and a third content area and a fourth content area display an image based on an external apparatus, the channel up/down control signal may control an image outputted from the first content area and the second content area. In this case, the controller 270 may determine a first content area and a second content area to be an area to be controlled according to the attribute of the control signal and control the displayer 250 to display a UI screen including information on only the first content area and the second content area. Alternatively, the controller 270 may control the displayer 250 to display a UI screen including only graphic (for example, a capture screen) with respect to the first content area and the second content area.

When the number of content areas where the received control signal is to be applied is more than two, and the control right regarding one of the content areas is not set, the controller 270 may control the display operation or the display status of at least one content area selected from the UI screen.

The operation explained above may be performed in response to an option to select an object to be controlled through the UI screen being turned on.

In response to the option to select an object to be controlled through the UI screen being turned off, even if the control signal is received, the controller 270 does not display the UI screen. However, the controller 270 may control the display operation or the display status of the content area where the control right is set among the plurality of content areas.

In response to an audio control signal for adjusting an audio being received, the controller 270 may control the displayer 250 to display the UI screen to select at least one content area among all content areas, as the audio control signal is a control signal which may be applied to the entire content areas. Herein, the audio control signal may include a control signal for operations such as volume up, volume down, sound effect (for example, eco effect, 3D effect, chorus effect, etc.), etc., but is not limited thereto. That is, another control signal for adjusting an audio may be included.

In response to at least one content area being selected from the UI screen, the controller 270 may control the speaker 260 to adjust an output status of the audio signal of the content displayed on the selected at least one content area, according to the audio control signal.

The controller 270, through the UI, may display the selected content area bigger than the content area which is not selected.

The controller 270 may give a control right to the selected content area, and display a message or other symbol indicating that the corresponding content area has the control right. For example, the controller 270 may control the displayer 250 to display a colored border around the selected content area, or to display a graphic which indicates the control right is in the content area. In this case, the graphic which indicates the control right is in the content area may include various graphics such as a text message, an image, a movement of only a content area where the control right exists, a shadow overlaying the content areas except for a content area where the control right exists, and so on.

According to the above explanation, the display apparatus 200, in response to displaying different contents through a plurality of split screens, may adaptively display the UI screen according to the number of split screens to which the received control signal is to be applied. Also, when there is the split screen which the control right is set, the display apparatus 200 may control the display operation or the display status of this split screen.

FIGS. 3A to 3D are drawings illustrating a display operation method of controlling the plurality of content areas according to the exemplary embodiment.

Figure 3A:
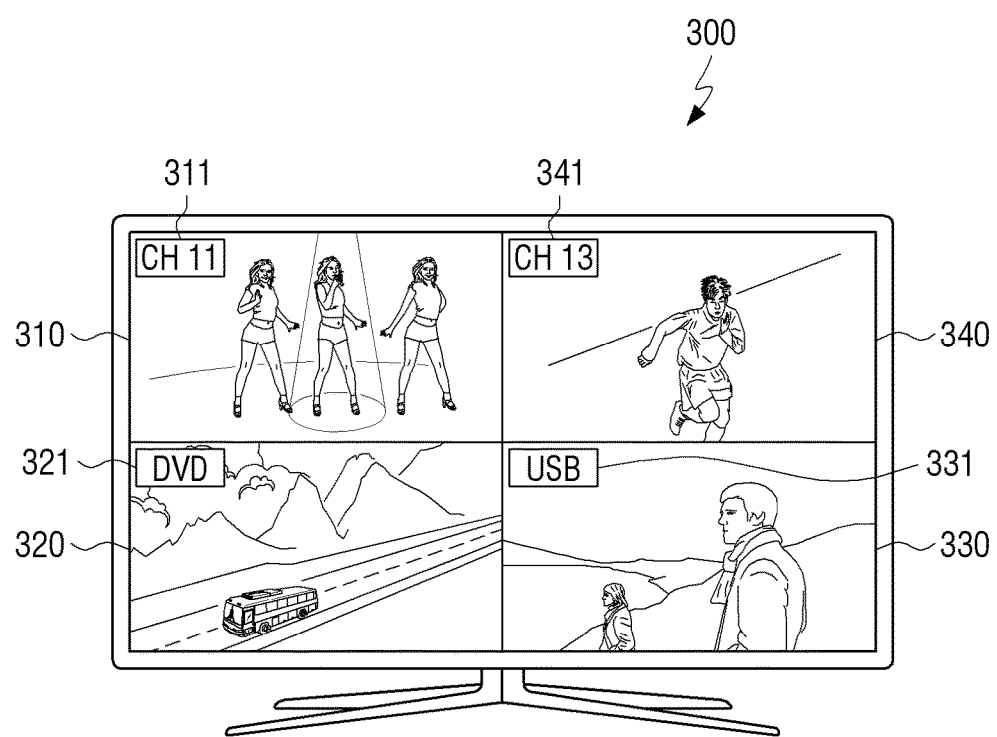
FIGS. 3A to 3D are views illustrating a method of controlling a display operation for a plurality of content areas according to an exemplary embodiment.

As illustrated in FIG. 3A, a display apparatus 300 displays a screen consisting of at least four content areas 310, 320, 330, 340. The four content areas 310, 320, 330, 340 display a separate content, respectively. A content displayed on the 4 content areas 310, 320, 330, 340 may be different each other.

For example, as illustrated in FIG. 3A, the first content area 310 displays a content pertaining to channel 11, and the second content area 320 displays a content received through a DVD. Also, the third content area 330 displays content received through a USB, and the fourth content area 340 displays a content pertaining to channel 13.

Identification information or input source information pertaining to a specific content may be displayed on an upper left part of the first content area to the fourth content area 310, 320, 330, 340. Specifically, the first content area 310 displays "CH 11" 311, which is the content identification information, the second content area 320 displays "DVD" 321, which is the input source information, the third content area 330 displays "USB" 331, which is the input source information, and the fourth content area 340 displays "CH 13" 341, which is the content identification information.

However, the location of the input source information and content identification information is not limited to the upper left part of the content area. The input source information and the content identification information may be located on the upper right portion, the lower left portion, and the lower right portion of the content areas.

Figure 3B:
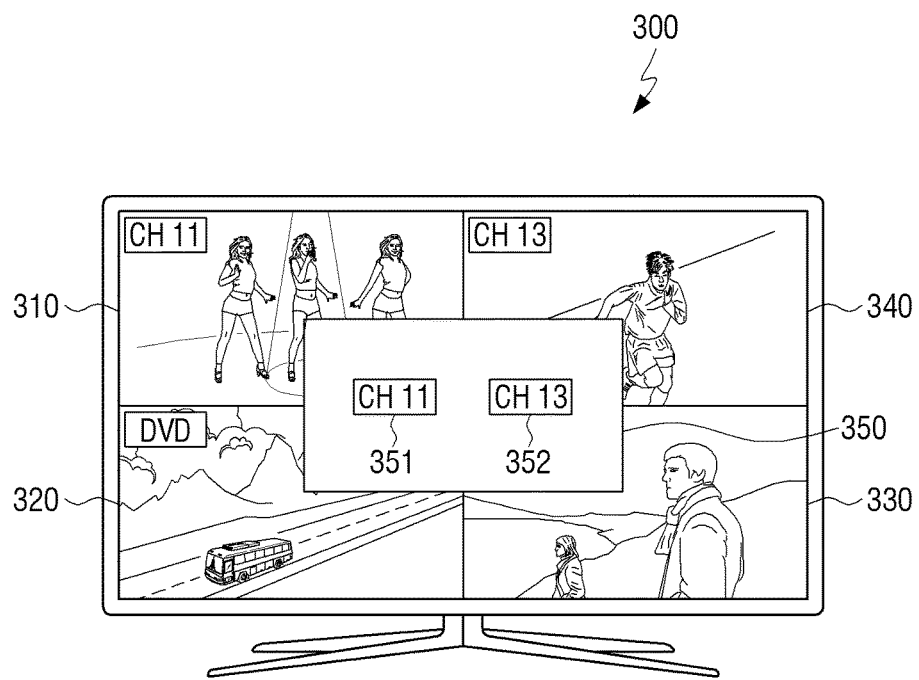

In response to a "channel up" control signal being received while different contents are displayed through the first content area to the forth content area 310, 320, 330, 340, the display apparatus 300, as illustrated in FIG. 3B, displays the UI screen 350 to select a content area where an object is to be controlled through the "channel up" control signal, that is, a content area where the "channel up" control signal is to be applied.

Specifically, in response to the "channel up" control signal being received, the display apparatus 300 confirms whether the content area which is able to be controlled according to the "channel up" control signal among the first content area to the fourth content area 310, 320, 330, 340 exists.

The first content area 310 and the fourth content area 340 which display different broadcasting contents may be controlled according to the "channel up" control signal, and thus, the display apparatus 300 may display the UI screen 350 including the first area information 351 and the second area information 352 pertaining to the first content area 310 and the fourth content area 340, respectively.

For example, the display apparatus 300 may display a graphic corresponding to the first area and the second area, and the graphic may be a thumbnail image including a captured image of each content area. Each graphic may include a box to enable the user to check and select a specific graphic. By selecting the specific graphic, a "confirm" option (not shown) located adjacent to the graphic corresponding to the first content area and the second content area may be selected to confirm the user's choice. A display operation and a display status corresponding to the content area may be changed, simultaneously.

In other words, the first area information 351 pertaining to the first content area 310 in the UI screen 350 may be "CH11," and the second area information 352 pertaining to the fourth content area 340 may be "CH13."

A user may select the first area information 351 or the second area information 352 from the UI screen 350 by using a remote controller or a touch function.

For example, when the user wants to apply the "channel up" control signal to the fourth content area 340, the user may select the second area information 352 from the UI screen.

Figure 3C:
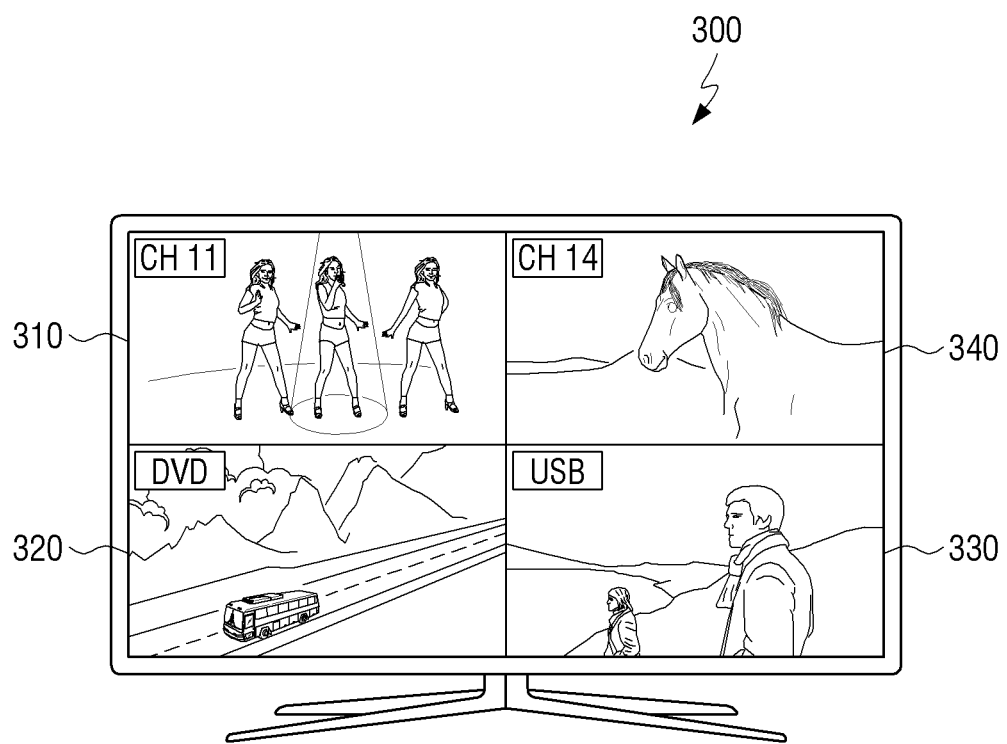

The second area information 352 corresponds to the fourth content area 340, and thus, the display apparatus 300 controls the display operation or the display status of the fourth content area 340. In other words, a channel of a content displayed in the fourth content area 340 may go up to "CH14" from "CH13." Accordingly, as illustrated in FIG. 3C, the content regarding "CH14" may be displayed on the fourth content area 340.

Figure 3D:
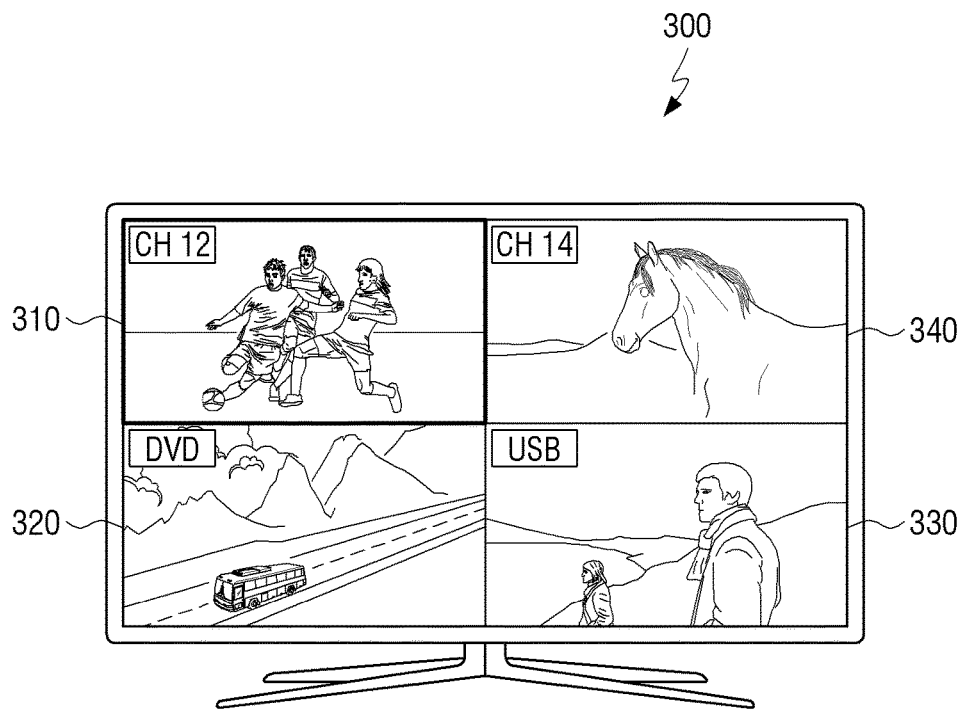

As illustrated in FIG. 3D, when a screen consisting of the first content area to the fourth content area 310, 320, 330, 340 is displayed, a control right pertaining to a control signal may be set to one of the content areas among the first content area to the fourth content area 310, 320, 330, 340. The control right may be a right to preferentially or exclusively control the display operation or the display status corresponding to various control signals which a user inputs through a remote controller or a touch function. Accordingly, in response to the control right being set to one of the content areas, the display operation or the display status of the content area may be controlled preferentially.

However, in response to a predetermined control signal being received while the control right is set to one of the content areas, the display apparatus 300 does not preferentially control an operation of the content area where the control right is set and displays UI screen 350 as illustrated in FIG. 3B.

Hereinafter, as illustrated in FIG. 3D, in response to the control signal being received while the control right is set to the first content area 310, an operation of the display apparatus 300 is explained.

In response to the "channel up" control signal being received, as illustrated in FIG. 3B, the display apparatus 300 displays the UI screen 350 including the area information 351, 352 pertaining to the first content area 310 and the fourth content area 340 where the "channel up" control signal may be applied.

In response to the first area information 351 corresponding to the first content area 310 being selected from the UI screen 350, the display apparatus 300 may control the display operation or the display status of the first content area 310 only where the control right is set.

However, in response to the second area information 352 corresponding to the fourth content area 340 being selected from the UI screen 350, the display apparatus 350 may simultaneously control in the display operation or the display status of the first content area 310 where the control right is set, and the display operation or the display status of the fourth content area 340 selected from the UI screen 350. Accordingly, as illustrated in FIG. 3D, a channel of the content displayed on the first content area 310 may go up to "CH12" from "CH11," and a channel of a content displayed on the fourth content area 340 may go up to "CH14" from "CH13."

Likewise, in response to the control signal which may be applied to the first content area 310 being received while the control right is set to the first content area 310, even if another content area is selected from the UI screen 350, the display apparatus 300 may control the display apparatus or the display status of the first content area 310.

In FIGS. 3A to 3D, the display apparatus 300 is explained to display a screen consisting of 4 content areas 310, 320, 330, 340. However, the number of content areas which make up the screen of the display apparatus 300 may be more or less than 4.

Also, when a multi view function or a split display function where the plurality of contents may be watched simultaneously through each content area by dividing the screen of the display apparatus 300 into the plurality of content areas is deactivated, the display apparatus 300 may display a content of one of the content areas on the entire screen.

Figure 4A:
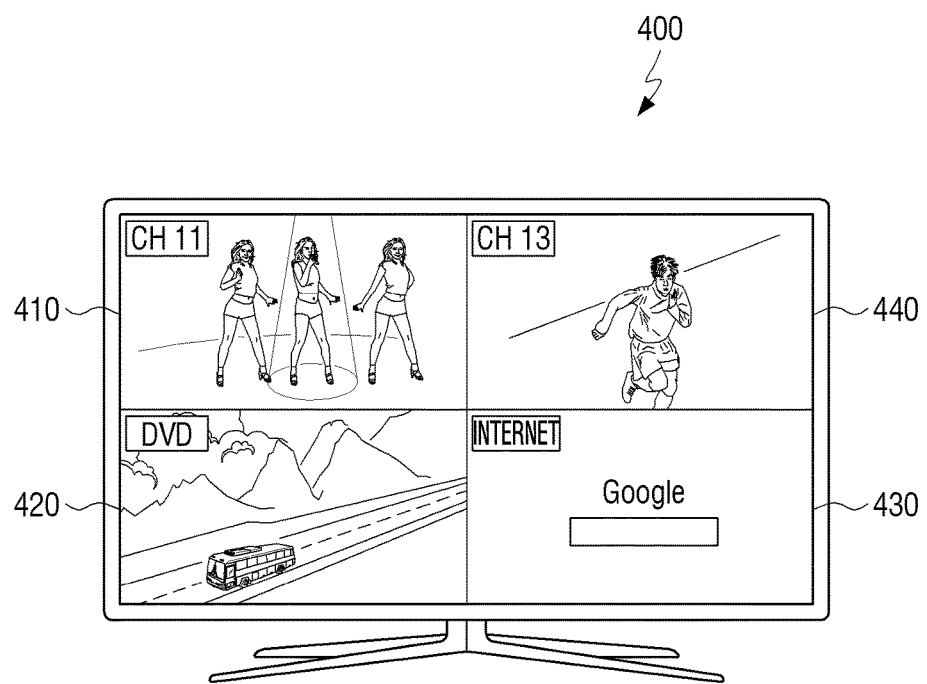
FIGS. 4A to 4B are views illustrating a method of controlling a display operation for a plurality of content areas according to another exemplary embodiment.
Figure 4B:
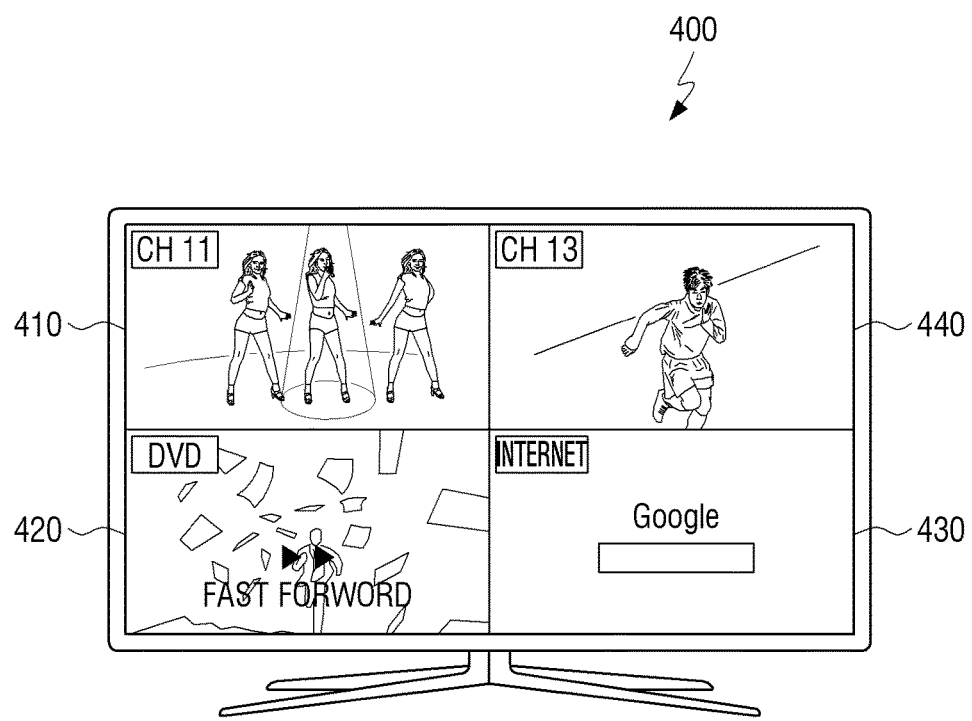

FIGS. 4A to 4B are drawings illustrating a method of controlling a display operation pertaining to a plurality of content areas according to another exemplary embodiment.

As illustrated in FIG. 4A, a display apparatus 400 displays a screen consisting of a first content area to a fourth content area 410, 420, 430, 440.

The first content area to the fourth content area 410, 420, 430, 440 may display different contents. For example, the first content area 410 displays a content pertaining to channel 11, and the second content area 410 displays content received through a DVD. Also, the third content area 430 displays content received through the Internet, and the fourth content area 440 displays a content pertaining to channel 13.

On an upper left part of the first to fourth content areas 410, 420, 430, 440, identification information or input source information regarding a content, such as "CH11," "DVD," "Internet," and "CH13," may be displayed. However, the location of the identification information or input source information in the upper left part is only exemplary. The identification information or input source information may also be located in the upper right corner, the lower left corner, or the lower right corner.

In response to a "fast forward" control signal being received while different contents are displayed through the first content area to fourth content area 410, 420, 430, 440, The display apparatus 400 may determine a content area where the "fast forward" control signal may be applied and transmit the "fast forward" control signal to a content source which provides the determined content area with contents.

For example, in response to only the second content area 420 among the first content area to the fourth content area 410, 420, 430, 440 being able to be controlled according to the "fast forward" control signal, the display apparatus 400, without displaying the UI screen 350 as shown in FIG. 3B, may directly control the display operation or the display status of the second content area 420 according to the "fast forward" control signal.

Specially, the display apparatus 400 transmits the "fast forward" control signal to a content source (for example, a DVD player) which provides the second content area 420 with contents, and as the result, as illustrated in FIG. 4B, the display apparatus 400 may display fast-forwarded content on the second content area 420, and also display the "fast forward" identification information.

In response to the content areas to be controlled according to the "fast forward" control signal among the first content area to the fourth content area being plural (for example, more than 2), the display apparatus 400 may display the UI screen for selecting the plurality of content areas to be controlled according to the "fast forward" control signal. In response to the content area where the "fast forward" control signal to be applied being selected from the UI screen, the display apparatus 400 transmits the "fast forward" control signal to a content source corresponding to the selected content area, and as the result, the display apparatus 400 may display fast-forwarded content on the selected content area.

Figure 5A:
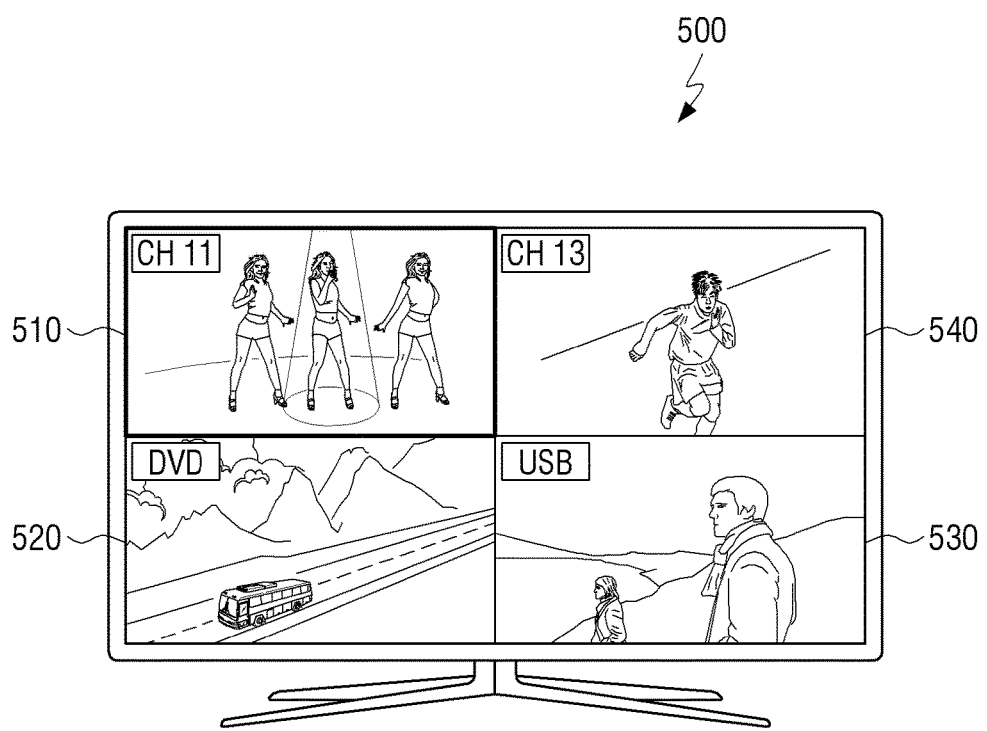
FIGS. 5A to 5B are views illustrating a method of controlling a display operation for a plurality of content areas according to another exemplary embodiment.
Figure 5B:
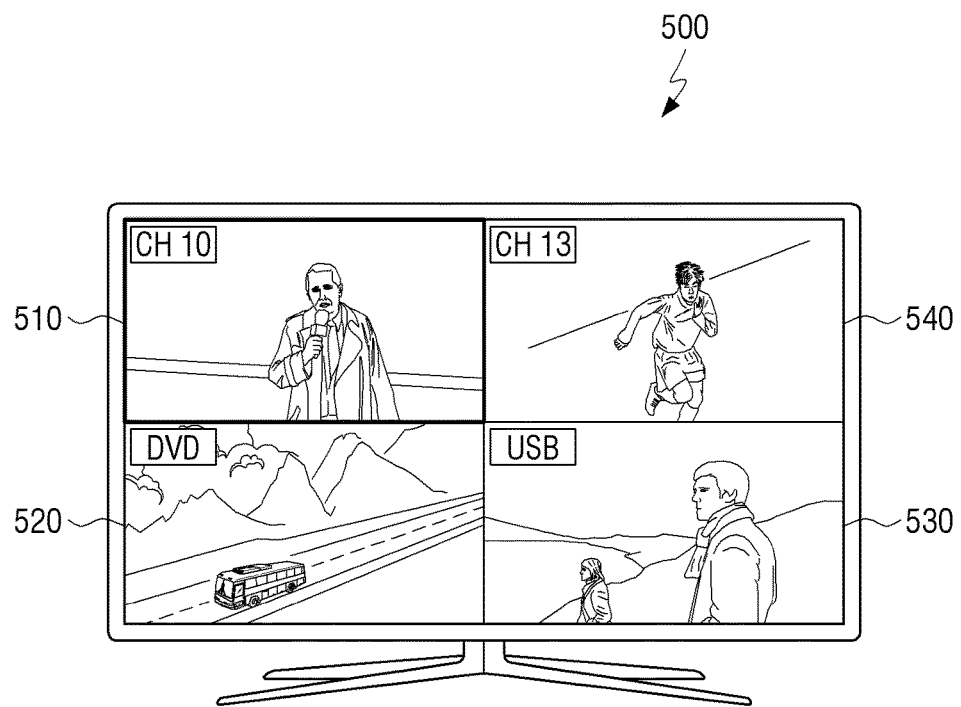

FIGS. 5A to 5B are drawings illustrating a method of controlling the display operation pertaining to the plurality of content areas according to another exemplary embodiment.

As illustrated in FIG. 5A, a display apparatus 500 displays a screen consisting of a first content area to a fourth content area 510, 520, 530, 540.

The first content area to the fourth content area 510, 520, 530, 540 may display different contents. For example, the first content area 510 displays a content pertaining to channel 11, and the second content area 520 displays content received through the DVD. Also, the third content area 530 displays content received through a USB, and the fourth content area 540 displays a content regarding channel 13.

Also, on an upper left part of the first content area to the fourth content area 510, 520, 530, 540, identification information or input source information regarding a content, such as "CH11," "DVD," "USB", and "CH13," may be displayed.

In response to different contents being displayed through the first content area to the fourth content area 510, 520, 530, 540, the display apparatus 500 may set the option to display the UI screen to select the content area to be controlled according to the predetermined control signal to be turned on or off. The setting to turn on or off the UI screen option may be according to the user's instruction.

In response to the control signal being received while the option to display the UI screen to select a content area to be controlled through the UI screen is turned off, the display apparatus 500 may control the display operation or the display status of the content areas where the control right is set among the first content area to the fourth content area according to the control signal.

For example, as illustrated in FIG. 5A, in response to a "channel down" control signal being received while the control right is set to the first content area 510, the display apparatus 500 may determine whether the option to display a UI screen and select a content area to be controlled through the UI screen is set to "on" or "off".

In response to the UI screen option being set to "off", the display apparatus 500 may apply the "channel down" control signal to the first content area 510 where the control right is set. Accordingly, the channel of the content displayed in the first content area may go down to "CH10" from "CH11." Accordingly, as illustrated in FIG. 5B, the content regarding "CH10" may be displayed on the first content area 510.

In response to the option to select the content area to be controlled through the UI screen being set to "on", the display apparatus 500 may display the UI screen 350 as illustrated in FIG. 3B. Accordingly, in response to one content area being selected from the UI screen 350, the display apparatus 500 may control the display operation or the display status of the selected content area, or may simultaneously control the display operation or the display status of the content area selected through the UI screen and the first content area 510 where the control right is set.

Figure 6A:
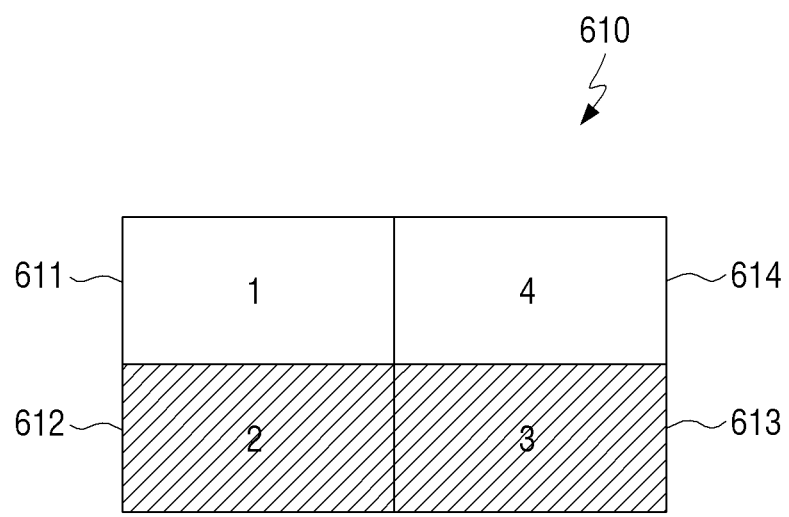
FIGS. 6A to 6C are views illustrating a UI screen according to various exemplary embodiments.
Figure 6B:
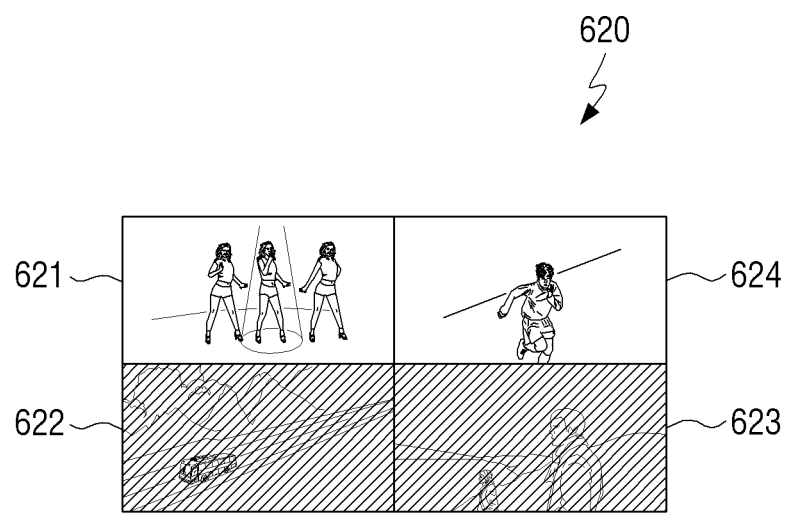
Figure 6C:
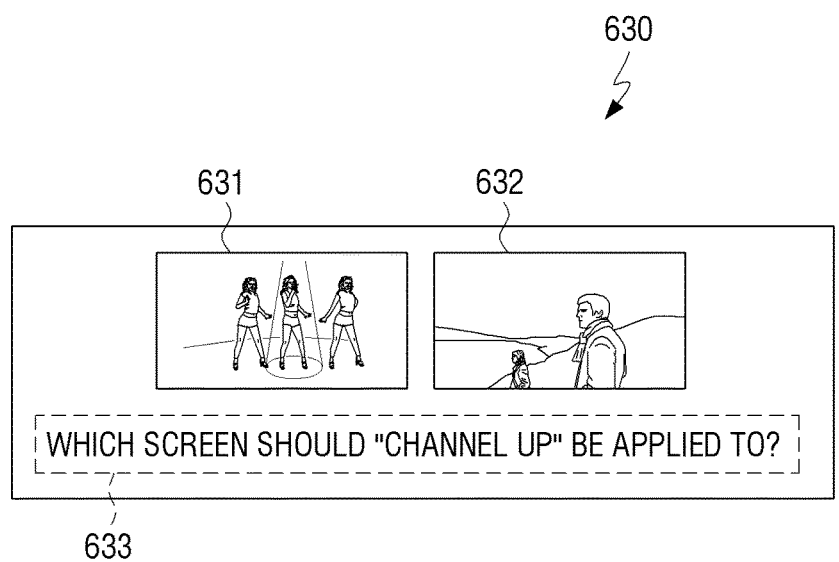

FIGS. 6A to 6C are drawings illustrating a UI screen according to various exemplary embodiments. FIGS. 6A to 6C illustrate, in response to a control signal being received from a user when different contents are displayed on a plurality of content areas, the UI screen to select the content area which is an area to be controlled where the control signal to be applied.

Referring to FIG. 6A, a UI screen 610 includes four areas 611, 612, 613, 614 corresponding to four content areas included in the screen of the display apparatus. Also, the four areas 611, 612, 613, 614 display an area number pertaining to each content area.

Specifically, the first area 611 corresponding to the first content area displays the number 1, and the second area 612 corresponding to the second content area displays the number 2. Also, the third area 613 corresponding to the third content area displays the number 3, and the fourth area 614 corresponding to the fourth content area displays the number 4.

In response to the control signal received by a user being applied to the first content area and the fourth content area, the UI screen 610 may display only the first area 611 and the fourth area 614 as an activated status which is selectable, and display the second area 612 and the third area 613 as an deactivated status which is not selectable. Accordingly, the user may select one of the first area 611 and the fourth area 614 from the UI screen 610.

In response to the control signal received by the user being an audio control signal for adjusting an audio, the audio control signal may be applied to all of the first content area to the fourth content area. Accordingly, in response to the audio control signal being received, the UI screen 610 may display the first area to the fourth area 611, 612, 613, 614 as an activated status.

Referring to FIG. 6B, the UI screen 620 includes a first graphic image to a fourth graphic image 621, 622, 623, 624 corresponding to the four content areas. In other words, in response to the control signal being received from the user, the display apparatus, by capturing the first content area to the fourth content area, is converted to the graphic image.

In response to the control signal received from the user being applied to the first content area and the fourth content area, the UI screen 620 may display only the first area 621 and the fourth area 624 corresponding to the first content area and the fourth content area as an activated status which is selectable, and display the second graphic image and the third graphic image corresponding to the second content area 622 and the third content area 623 as a deactivated status which is not selectable.

Referring to FIG. 6C, the UI screen 630 includes a first graphic image 631 and a second graphic image 632 pertaining to the first content area and the third content area where the control signal is applied among the four content areas. In other words, in response to the control signal being received from the user, the display apparatus, by capturing the first content area and the third content area, is converted to the graphic image.

The UI screen 630 may display a guide message that the user is able to select a screen to apply an received control signal by displaying a sentence, "which screen should 'channel up' be applied to?" with the first graphic image 631 and the second graphic image 632.

Accordingly, the user is able to recognize that the control signal which the user inputted is applied to the first content area and the third content area, and the content area where the control signal is applied may be selected from the UI screen 630.

Figure 7:
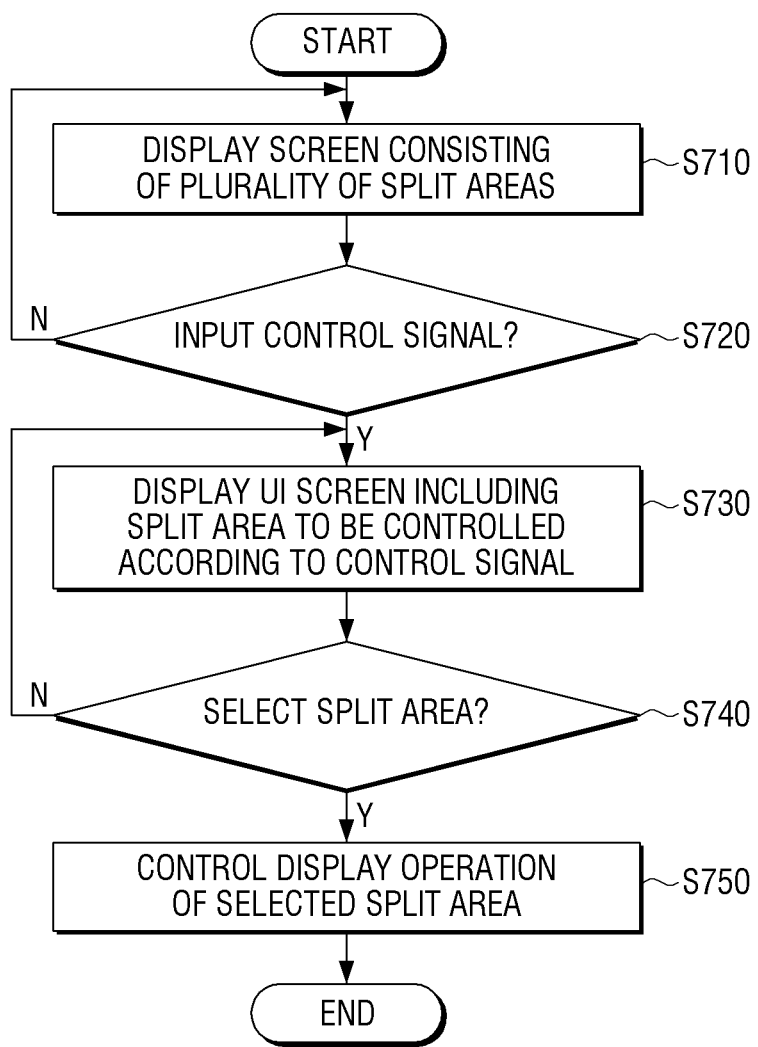
FIGS. 7 to 10 are flowcharts explaining a method of controlling a display apparatus according to various exemplary embodiments.

FIG. 7 is a flowchart explaining a method of controlling the display apparatus according to an exemplary embodiment. According to FIG. 7, the display apparatus displays a screen consisting of a plurality of content areas indicating different contents in operation S710. Specifically, the display apparatus displays the plurality of contents received through various input sources in the plurality of content areas, respectively.

In response to a predetermined control signal being received in operation S720, the display apparatus displays the UI screen to select a content area to be controlled according to the control signal in operation S730. Herein, the control signal is a signal to control a content display operation or display status, and the control signal may be a signal to control channel up, channel down, fast forward, rewind, display effect, stop, etc.

In response to at least one content area being selected from the UI screen in operation S740, the display apparatus controls the display operation of the at least one content area selected from the UI screen according to the control signal in operation S750.

Figure 8:
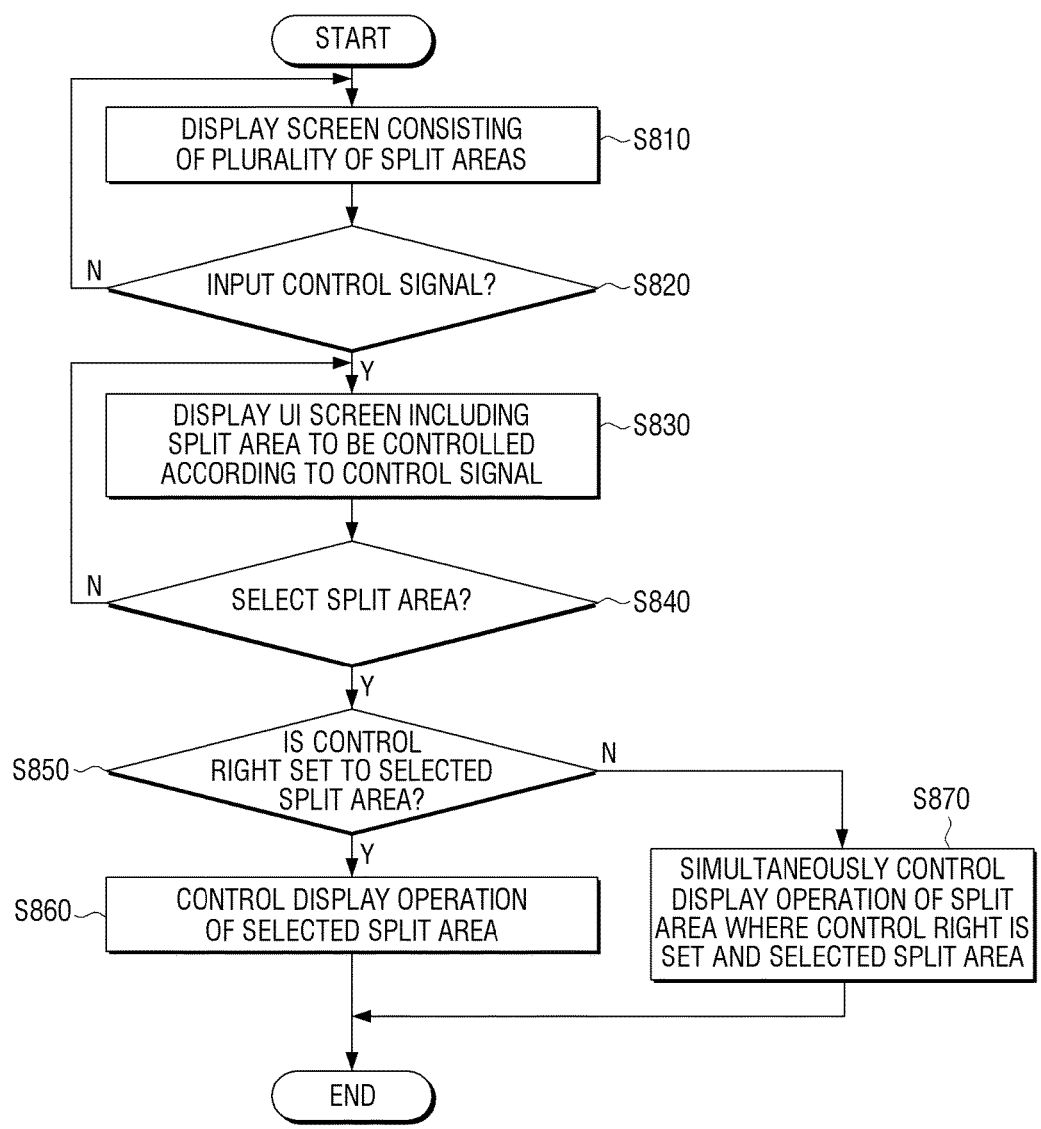

FIG. 8 is a flowchart explaining a method of controlling the display apparatus according to another exemplary embodiment. According to FIG. 8, the display apparatus displays a screen consisting of the plurality of content areas indicating different contents in operation S810.

In response to a predetermined control signal being received in operation S820, the display apparatus displays the UI screen including a content area to be controlled according to the control signal S830.

In response to one of the content areas being selected from the UI screen in operation S840, the display apparatus determines whether the control right is set to the selected content area in operation S850.

In response to the control right being set to the content area selected from the UI screen in operation S850, the display apparatus controls the display operation of the content area selected from the UI screen according to the control signal in operation S860. However, when the control right is not yet set to the content area selected from the UI screen in operation S850, the display apparatus simultaneously controls the content area where the control right is set, and the display operation of the content area selected from the UI screen, according to the control signal in operation S870.

Figure 9:
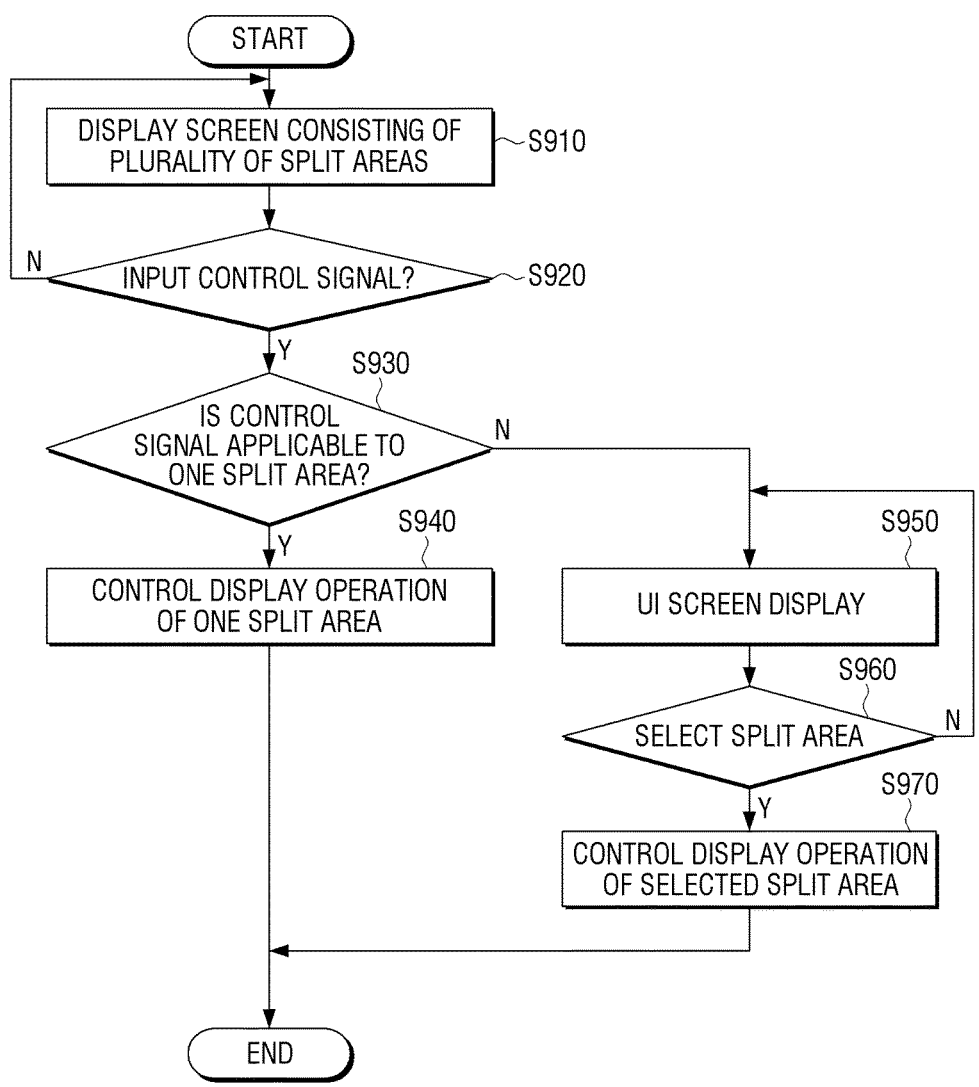

FIG. 9 is a flowchart explaining a method of controlling the display apparatus according to another exemplary embodiment. According to FIG. 9, the display apparatus displays a screen consisting of a plurality of content areas indicating different contents in operation S910.

In response to a predetermined control signal being received in operation S920, the display apparatus determines whether the control signal is applied to only one content area among the plurality of content areas in operation S930.

In response to the control signal being applied to the only one content area in operation S930, the display apparatus controls a display operation of the one content area according to the control signal in operation S940.

However, in response to the control signal being applied to the plurality of content areas (for example, more than 2) in operation S930, the display apparatus displays the UI screen including the content area to be controlled according to the control signal S950.

In response to at least one content area being selected from the UI screen in operation S960, the display apparatus controls the display operation of the at least one content area selected from the UI screen, according to the control signal in operation S970.

Figure 10:
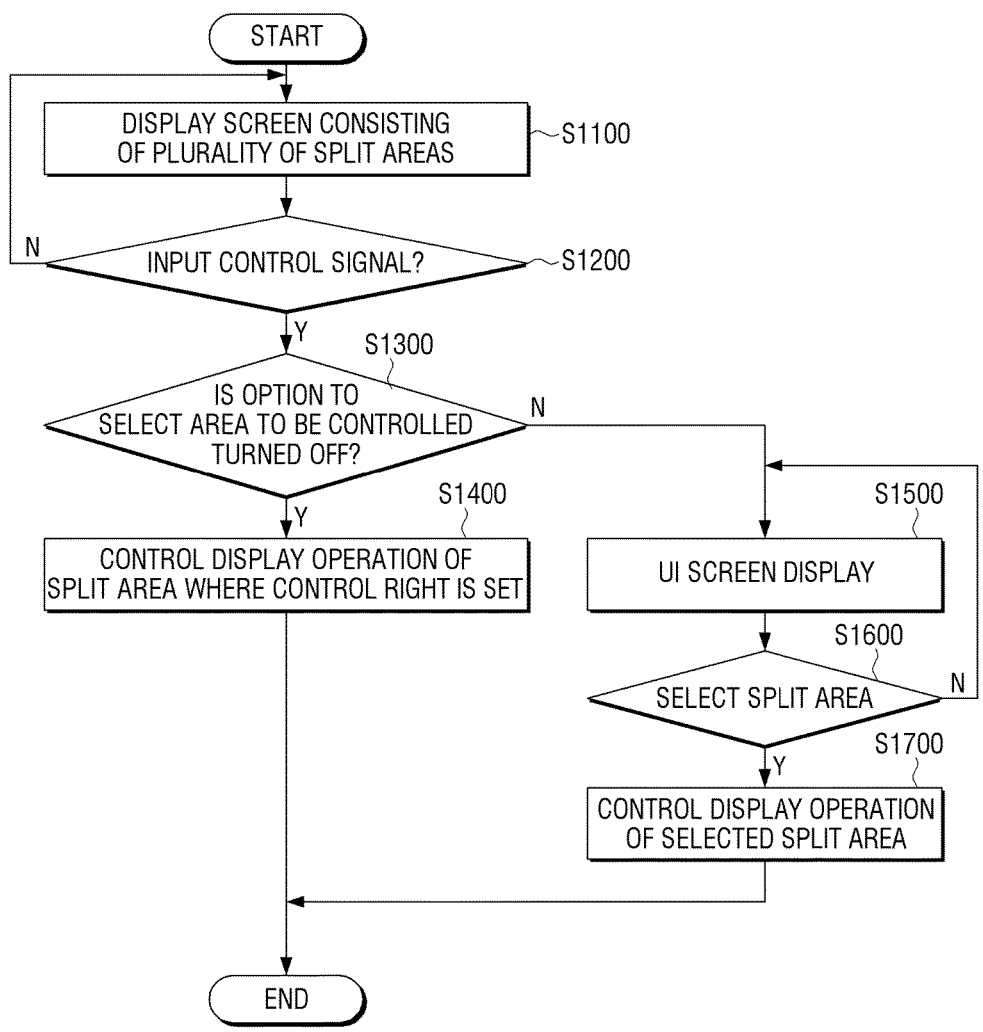

FIG. 10 is a flowchart explaining a method of controlling a display apparatus according to another exemplary embodiment. According to FIG. 10, the display apparatus displays a screen consisting of a plurality of content areas indicating different contents in operation S1100.

In response to a predetermined control signal being received in operation S1200, the display apparatus determines whether an option to select an object to be controlled is turned off in operation S1300. Herein, the object to be controlled may be at least one content area. Accordingly, the display apparatus may determine whether the option to provide the UI screen for selecting at least one content area is turned off or turned on.

In response to the option to select the object to be controlled being turned off in operation S1300, the display apparatus controls the display operation of the content area where the control right is set, according to the control signal in operation S1400.

However, in response the option to select the content area to be controlled being turned on in operation S1300, the display apparatus displays the UI screen including the content area to be controlled according to the control signal in operation S1500.

In response to at least one content area being selected from the UI screen in operation S1600, the display apparatus controls the display operation of at least one content area selected from the UI screen, according to the control signal in operation S1700.

The method of controlling as described above may be implemented by a computer program (or an application) including an algorithm which is executable in a computer, and the program may be stored and provided to a non-transitory computer readable medium.

Moreover, while not required in all aspects, one or more of the above-described elements can include a processor or microprocessor executing a computer program stored in a non-transitory computer-readable medium.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of controlling a display apparatus, the method comprising:
   displaying a screen comprising a plurality of content areas which display different contents from each other;
   in response to a channel control signal being received, determining at least one content area to which the channel control signal can be applied among the plurality of content areas;
   when it is determined that the channel control signal can be applied to two or more content areas among the plurality of content areas which are currently displayed, displaying a user interface (UI) screen for selecting a content area to be controlled using the channel control signal among the two or more content areas; and
   in response to at least one content area being selected from the UI screen, controlling a channel control operation of the selected at least one content area, based on the channel control signal.

2. The method of claim 1, further comprising:
   in response to a control right being set for one content area among the plurality of content areas, simultaneously controlling a channel control operation of the content area where the control right is set and the at least one of the content areas which is selected from the UI screen, according to the channel control signal.

3. The method of claim 1, further comprising:
   in response to a channel control signal for performing an operation which applies to only one content area among the plurality of content areas being received, controlling a channel control operation of the one of the content areas based on the channel control signal, without displaying the UI screen.

4. The method of claim 1, the method further comprising:
   in response to the channel control signal being received while an option to select the content area to be controlled through the UI screen is turned off, controlling a channel control operation of a content area where a control right is set among the plurality of content areas, according to the channel control signal.

5. The method of claim 1, the method further comprising:
   in response to an audio control signal for adjusting an audio being received, adjusting an output status of an audio signal of a content displayed on the at least one of the content areas which is selected from the UI screen, according to the audio control signal.

6. The method of claim 1, wherein the UI screen comprises a graphic image corresponding to at least one content area where the channel control signal is applied among the plurality of content areas.

7. The method of claim 1, wherein the UI screen comprises a plurality of graphic images corresponding to the plurality of content areas, respectively.

8. A display apparatus comprising:
   a displayer configured to display a screen comprising a plurality of content areas which display different contents from each other;
   a controller configured to, in response to a channel control signal being received, determine at least one content area to which the channel control signal can be applied among the plurality of contents areas; and
   a user interface (UI) generator configured to, when it is determined that the channel control signal can be applied to two or more content areas among the plurality of content areas which are currently displayed, generate a UI screen to select a content area to be controlled using the channel control signal among the two or more content areas,
   wherein the controller controls the displayer to display the generated UI screen, and in response to at least one content area being selected from the UI screen, to control a channel control operation of the selected at least one content area, based on the channel control signal.

9. The display apparatus of claim 8, wherein in response to a control right being set for one content area among the plurality of content areas, the controller simultaneously controls a channel control operation of a content area where the control right is set and the at least one of the content areas which is selected from the UI screen, according to the channel control signal.

10. The display apparatus of claim 8, wherein in response to a channel control signal for performing an operation which is applied to only one content area among the plurality of content areas being received, the controller controls a channel control operation of the at least one of the content areas based on the channel control signal, without displaying the UI screen.

11. The display apparatus of claim 8, wherein in response to the channel control signal being received while an option to select an object to be controlled through the UI screen is turned off, the controller controls a channel control operation of a content area among the plurality of content areas where a control right is set, according to the channel control signal.

12. The method of claim 8, wherein in response to an audio control signal for adjusting an audio being received, the controller adjusts an output status of an audio signal of a content displayed on the at least one of the content areas which is selected from the UI screen, according to the audio control signal.

13. The display apparatus of claim 8, wherein the UI screen comprises a graphic image corresponding to at least one content area where the channel control signal is applied among the plurality of content areas.

14. The display apparatus of claim 8, wherein the UI screen comprises a plurality of graphic images corresponding to the plurality of content areas, respectively.

\* \* \* \* \*